US009860755B2

(12) United States Patent
Lee et al.

(10) Patent No.: US 9,860,755 B2
(45) Date of Patent: Jan. 2, 2018

(54) METHOD AND APPARATUS FOR SETTING OPERATION CHANNEL IN WHITE SPACE FOR CONTIGUOUS TV CHANNELS

(71) Applicant: LG Electronics Inc., Seoul (KR)

(72) Inventors: Wookbong Lee, Gyeonggi-do (KR); Jinsam Kwak, Gyeonggi-do (KR); Suhwook Kim, Gyeonggi-do (KR); Jinsoo Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 473 days.

(21) Appl. No.: 14/401,203

(22) PCT Filed: Apr. 1, 2013

(86) PCT No.: PCT/KR2013/002678
§ 371 (c)(1),
(2) Date: Nov. 14, 2014

(87) PCT Pub. No.: WO2013/176394
PCT Pub. Date: Nov. 28, 2013

(65) Prior Publication Data
US 2015/0139099 A1 May 21, 2015

Related U.S. Application Data

(60) Provisional application No. 61/651,003, filed on May 24, 2012.

(51) Int. Cl.
*H04W 16/14* (2009.01)
*H04W 84/12* (2009.01)
*H04W 72/04* (2009.01)

(52) U.S. Cl.
CPC ........ *H04W 16/14* (2013.01); *H04W 72/0453* (2013.01); *H04W 84/12* (2013.01)

(58) Field of Classification Search
CPC ...... H04W 16/14; H04W 72/00; H04W 84/12
See application file for complete search history.

(56) References Cited

U.S. PATENT DOCUMENTS

| 2010/0085921 A1 | 4/2010 | Wu et al. |
|---|---|---|
| 2011/0222493 A1 | 9/2011 | Mangold et al. |

(Continued)

FOREIGN PATENT DOCUMENTS

| WO | 2011/145811 A2 | 11/2011 |
|---|---|---|
| WO | 2011/163622 A1 | 12/2011 |
| WO | 2012/028769 A1 | 3/2012 |

OTHER PUBLICATIONS

International Search Report issued in corresponding International Patent Application No. PCT/KR2013/002678 dated Jul. 29, 2013.

(Continued)

*Primary Examiner* — Edan Orgad
*Assistant Examiner* — Saumit Shah
(74) *Attorney, Agent, or Firm* — Morgan, Lewis & Bockius LLP

(57) ABSTRACT

The present invention relates to a method for setting operating channels in a white space region and to an apparatus therefor. In particular, the method for a device to set operating channels in a white space region includes the steps of: obtaining information on available TV channels from a geolocation database; and setting operating channels including multiple bandwidths in a plurality of consecutive TV channels, wherein the central frequencies of signals that are transmitted over two consecutive TV channels included in the plurality of consecutive TV channels, respectively, can be moved by as much as a first offset (m) and a second offset (n) in the direction of the center of the two consecutive TV channels, respectively.

10 Claims, 9 Drawing Sheets

(56) References Cited

U.S. PATENT DOCUMENTS

| | | | |
|---|---|---|---|
| 2012/0201213 A1* | 8/2012 | Banerjea | H04W 72/0453 370/329 |
| 2012/0238226 A1* | 9/2012 | Vermani | H04L 5/0007 455/118 |
| 2013/0003679 A1* | 1/2013 | Seok | H04W 74/006 370/329 |

OTHER PUBLICATIONS

Written Opinion and International Search Report issued in corresponding International Patent Application No. PCT/KR2013/002678 dated Jul. 29, 2013.

\* cited by examiner

METHOD AND APPARATUS FOR SETTING OPERATION CHANNEL IN WHITE SPACE FOR CONTIGUOUS TV CHANNELS

TECHNICAL FIELD

The present invention relates to a wireless communication system, and more particularly, to a method of setting an operation channel in a white space band and an apparatus therefor.

BACKGROUND ART

A standard for a wireless local area network (WLAN) technology has been developed as IEEE (Institute of Electrical and Electronics Engineers) 802.11 standard. IEEE 802.11a and IEEE 802.11b use an unlicensed band in 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps in a manner of applying Orthogonal Frequency Division Multiplexing (OFDM) in 2.4 GHz. IEEE 802.11n provides transmission speed of 300 Mbps for 4 spatial streams in a manner of applying Multiple Input Multiple Output—OFDM (MIMO-OFDM). IEEE802.11n supports a channel bandwidth up to 40 MHz. In this case, IEEE802.11n provides transmission speed of 600 Mbps.

Currently, ongoing effort to develop IEEE 802.11af standard has been performed. IEEE 802.11af standard is a standard set to regulate an operation of an unlicensed device in a TV whitespace (TVWS) band.

The TVWS band is a frequency band assigned for a TV broadcast and includes a Very High Frequency (VHF) band and an Ultra High Frequency (UHF) band. The TVWS means a frequency band permitted to an unlicensed device to use under a condition that the unlicensed device does not impede a communication of a licensed device operating in a corresponding frequency band. In particular, a device operating as the unlicensed device can use an available channel or an available frequency band, which is not used by the licensed device, in the corresponding frequency band. In this case, the licensed device can include a TV, a wireless microphone, and the like. The licensed device may be called a licensed user, an incumbent user, a primary user or the like.

The unlicensed device wishing to use the TV WS band should provide a protection function for a licensed device. Hence, the unlicensed device should check whether the licensed device occupies a corresponding band before starting signal transmission in the TV WS band to obtain information on an available channel.

To this end, the unlicensed device can check whether a corresponding band is used by the licensed device by performing spectrum sensing. An energy detection scheme (a scheme of judging a use of an incumbent user if a strength of a reception signal is greater than a prescribed value), a feature detection scheme (a scheme of judging a use of an incumbent user if a digital TV preamble is detected), and the like can be utilized as the spectrum sensing mechanism. If strength of a signal received on a specific channel is greater than a prescribed value or a DTV (digital TV) preamble is detected, the unlicensed device can determine it as the specific channel is in use by the licensed device. If it is determined that the licensed device uses a channel directly adjacent to a channel currently used by the unlicensed device, transmit power of the unlicensed device should be lowered according to the extent of an amount of interference radiated to an adjacent band in some cases.

Yet, if the unlicensed device depends on frequency sensing only in the TV WS band to obtain information on an available channel, a burden of sensing of the unlicensed device to operate in the TV WS band grows and a procedure may be delayed. Hence, the unlicensed device may obtain channel list information available for a corresponding region in a manner of accessing a geo-location database via the Internet or a dedicated network. The geo-location database is a database storing and managing channel usage information, which is dynamically changing according to information of registered licensed devices, geographical locations of the licensed devices and channel usage time.

DISCLOSURE OF THE INVENTION

Technical Tasks

One object of the present invention is to propose a method of smoothly setting an operation channel in a white space band in a wireless communication system, preferably, in a WLAN (wireless local area network) system supporting an operation in the white space band and an apparatus therefor.

If contiguous white space bands are available, another object of the present invention is to propose a method of setting an operation channel in a white space band based on carrier frequency offset estimation and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of setting an operation channel, set by a device in a white space band, includes the steps of obtaining information on an available TV channel from a geo-location database (GDB) and if a plurality of contiguous TV channels are available, setting an operation channel including multiple bandwidths to a plurality of the contiguous TV channels, wherein center frequencies of signals respectively transmitted from 2 contiguous TV channels included in a plurality of the contiguous TV channels are shifted to a center of the 2 contiguous TV channels as much as a first offset (m) and a second offset (n), respectively.

To further achieve these and other advantages and in accordance with the purpose of the present invention, according to a different embodiment, a device setting an operation channel in a white space band includes an RF (radio frequency) unit configured to transmit and receive a radio signal and a processor configured to obtain information on an available TV channel from a geo-location database (GDB) and, if a plurality of contiguous TV channels are available, set an operation channel including multiple bandwidths to a plurality of the contiguous TV channels, wherein center frequencies of signals respectively transmitted from 2 contiguous TV channels included in a plurality of the contiguous TV channels are shifted to a center of the 2 contiguous TV channels as much as a first offset (m) and a second offset (n), respectively.

Preferably, when the number of a plurality of the contiguous TV channels corresponds to 2, if a subcarrier index 0 is given to a boundary of a plurality of the contiguous TV channels, a positive subcarrier index is sequentially given in a frequency ascending order and a negative subcarrier index is sequentially given in a frequency descending order, the center frequencies of the signals respectively transmitted from a plurality of the contiguous TV channels can be positioned at a subcarrier index −72+n and a subcarrier index 72−m, respectively.

Preferably, when the number of a plurality of the contiguous TV channels corresponds to 4, if a subcarrier index 0 is given to a boundary between contiguous 2 lower TV channels and contiguous 2 upper TV channels among a plurality of the contiguous TV channels, a positive subcarrier index is sequentially given in a frequency ascending order and a negative subcarrier index is sequentially given in a frequency descending order, the center frequencies of the signals respectively transmitted from a plurality of the contiguous TV channels can be positioned at a subcarrier index −216+n, a subcarrier index −72−m, a subcarrier index 72+n and a subcarrier index 216−m, respectively.

Preferably, a sum of the m and the n is equal to or greater than 5 and is equal to or less than 26.

Preferably, a sum of the m and the n is equal to or greater than 3 and is equal to or less than 26.

Preferably, an STF (short training field) signal can be transmitted on a single subcarrier in every 8 subcarrier indexes.

Advantageous Effects

According to embodiment of the present invention, it is able to smoothly set an operation channel in a white space band in a wireless communication system, preferably, in a WLAN (wireless local area network) system supporting an operation in the white space band.

According to embodiment of the present invention, if contiguous white space bands are available, it is able to efficiently set an operation channel without expanding a size of FFT (Fast Fourier Transform)/IFFT (Inverse Fast Fourier Transform) based on carrier frequency offset estimation.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

Specific terminologies used in the following description are provided to help the understanding of the present invention and can be modified to a different form in a scope of not deviating from the technical idea of the present invention.

Embodiments of the present invention can be supported by the standard documents disclosed in at least one of IEEE 802 system, a 3GPP system, 3GPP LTE/LTE-A (LTE-Advanced), and a 3GPP2 system, which correspond to wireless access systems. In particular, steps or parts among the embodiments of the present invention, which are not explained to clearly disclose the technical idea of the present invention, can be supported by the documents. And, all terminologies disclosed in the present specification can be explained by the standard document.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3$^{rd}$ Generation Partnership Project) LTE (long term evolution) is a part of E-UMTS (Evolved UMTS) that uses E-UTRA. The 3GPP LTE adopts OFDMA in downlink and SC-FDMA in uplink. And, LTE-A (LTE-Advanced) is an evolved version of 3GPP LTE.

For clarity, the following description mainly concerns IEEE 802.11 system, by which the technical idea of the present invention may be non-limited.

The Generals of IEEE 802.11 System to which the Present Invention is Applicable

Figure 1:
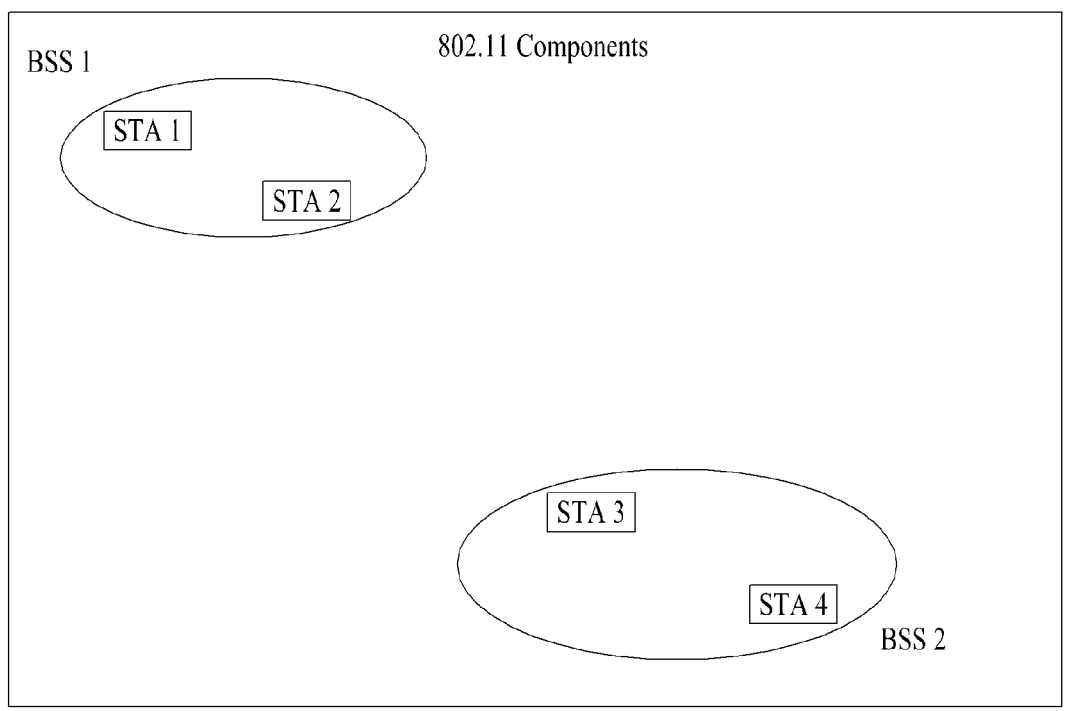
FIG. 1 is a diagram for an example of a structure of IEEE 802.11 system to which the present invention is applicable.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 depicts an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). An oval indicating a BSS in FIG. 1 may be comprehended as a coverage area of the STAs included in the BSS to maintain a communication. This area can be called a basic service area (hereinafter abbreviated BSA). If an STA moves out of the BSA, the STA cannot directly communicate with different STAs within the BSA.

A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA should be associated with the BSS. The association can be dynamically set and may include a use of a distribution system service (hereinafter abbreviated DSS).

Figure 2:
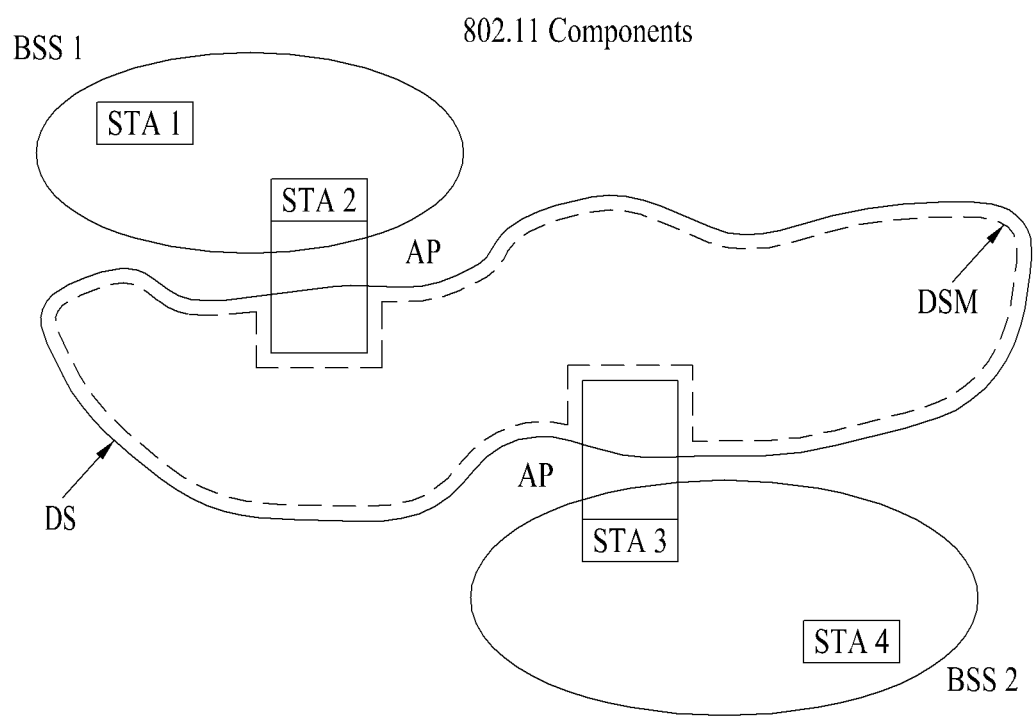
FIG. 2 is a diagram for a different example of a structure of IEEE 802.11 system to which the present invention is applicable.

FIG. 2 is a diagram for a different example of a structure of IEEE 802.11 system to which the present invention is applicable. FIG. 2 is a form to which such a configuration element as a distribution system (DS), a distribution system medium (DMS), an access point (AP), and the like is added to the structure of FIG. 1.

In a LAN, a direct distance between stations can be restricted by PHY (physical) performance. In some cases, the distance may be sufficient to perform a communication. Yet, in some cases, it may be necessary to perform a communication of a longer distance between stations. The distribution system (DS) can be configured to support an extended coverage.

The DS means a structure that BSSs are connected with each other. Specifically, instead of independently existing as depicted in FIG. 1, a BSS may exist as a configuration element of an extended form of a network consisting of a plurality of BSSs.

The DS is a logical concept and can be characterized by an attribute of the distribution system medium (DSM). Regarding this, IEEE 802.11 standard logically distinguishes a wireless medium (WM) from the distribution system medium (DSM). Each of the logical media is used for purposes different from each other and is used by configuration elements different from each other. According to the definition of IEEE 802.11 standard, the media may be limited to neither an identical medium nor media different from each other. Flexibility of the IEEE 802.11 LAN structure can be explained in that pluralities of the media are logically different from each other. In particular, IEEE 802.11 LAN structure can be variously implemented. The corresponding LAN structure can be independently characterized by a physical attribute of each implementation example.

The DS can support a mobile device in a manner of providing the mobile device with a seamless integration of a plurality of BSSs and logical services necessary for controlling an address to a destination.

The AP enables related STAs to access the DS via the WM and means an entity having STA functionality. Data can move between the BSS and the DS via the AP. For instance, an STA 2 and an STA 3 depicted in FIG. 2 have STA functionality and provide a function of enabling the related STAs (an STA 1 and an STA 4) to access the DS. And, since all APs basically correspond to an STA, all APs are entities capable of being addressed. An address used by the AP for a communication in the WM may not be identical to an address used by the AP for a communication in the DS.

A data transmitted to an STA address of an AP from one of STAs related to the AP is always received in an uncontrolled port and can be processed by IEEE 802.1X port entity. And, if a controlled port is authenticated, a transmission data (or a frame) can be delivered to the DS.

Figure 3:
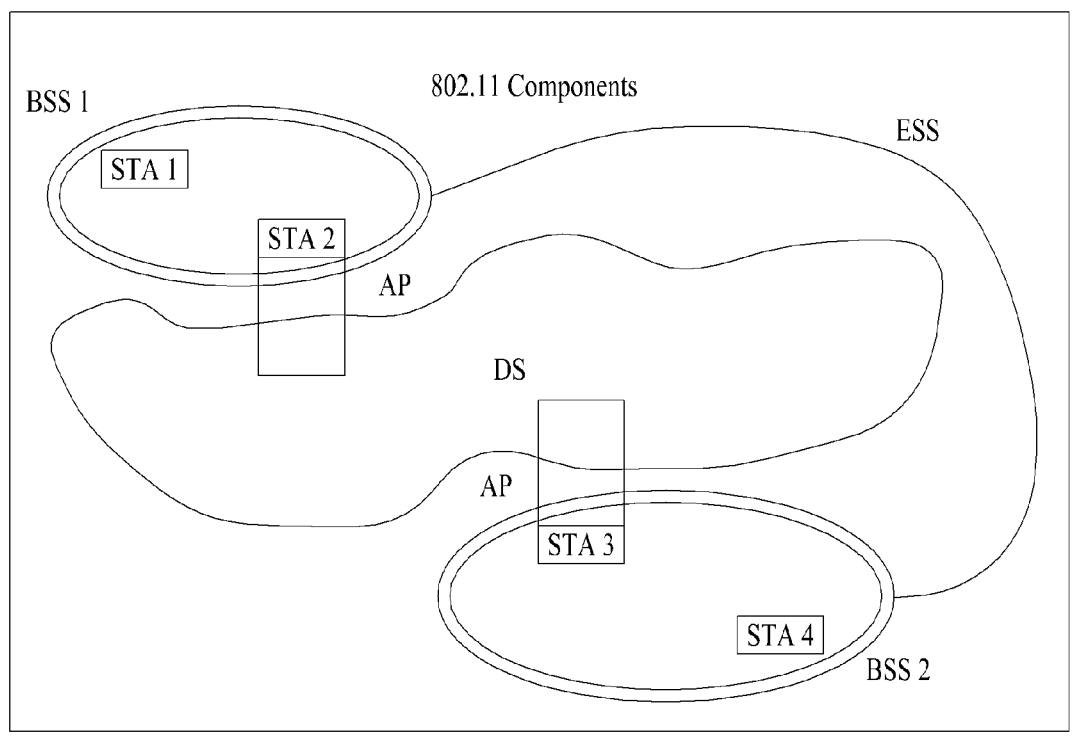
FIG. 3 is a diagram for a further different example of a structure of IEEE 802.11 system to which the present invention is applicable.

FIG. 3 is a diagram for a further different example of a structure of IEEE 802.11 system to which the present invention is applicable. FIG. 3 conceptually shows an extended service set (hereinafter abbreviated ESS) configured to provide a wider coverage in addition to the structure of FIG. 2.

A wireless network of an arbitrary size and complexity may consist of a DS and BSSs. This kind of network is called an ESS network in IEEE 802.11 system. The ESS may correspond to a set of BSSs connected with a single DS. Yet, the ESS does not include the DS. The ESS network is seen as an IBSS network in a LLC (logical link control) layer. STAs included in the ESS can communicate with each other and moving STAs can move from one BSS to another BSS (within an identical ESS) in a manner of being transparent to the LLC.

According to IEEE 802.11, nothing is assumed for a physical location of the BSSs depicted in FIG. 3. Forms described in the following are all available in IEEE 802.11. The BSSs can be partly overlapped with each other. This is a form generally used to provide a continuous coverage. And, the BSSs may not be physically connected with each other and there is no limit for a logical distance between the BSSs. The BSSs can be physically positioned at an identical location. This can be used to provide a redundancy. And, one (or more) IBSS or ESS networks can physically exist in an identical space as one (or more) ESS network. This may correspond to a form of the ESS network in case that an ad-hoc network operates in the location at which the ESS network exists, physically duplicated IEEE 802.11 networks are configured by different organizations, two or more different access and security policies are required in an identical location, and the like.

Figure 4:
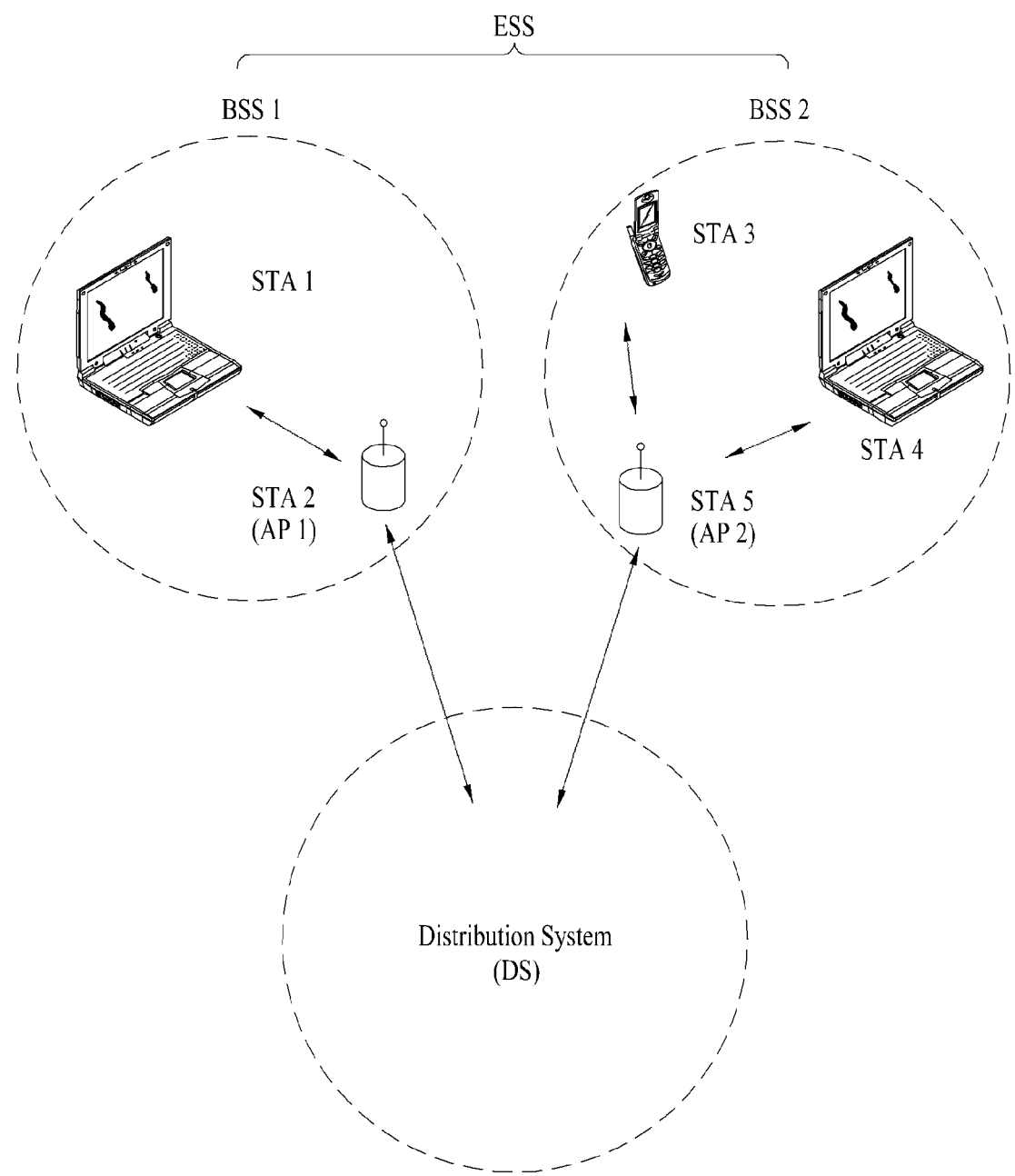
FIG. 4 is a diagram for an example of a structure of WLAN system.

FIG. 4 is a diagram for an example of a structure of WLAN system. FIG. 4 shows an example of an infrastructure BSS including a DS.

According to the example of FIG. 4, an ESS consists of a BSS 1 and a BSS 2. In a WLAN system, an STA corresponds to a device operating in accordance with a MAC/PHY regulation of IEEE 802.11. The STA includes an AP STA and a non-AP STA. The non-AP STA corresponds to a device directly controlled by a user such as a laptop computer and a cellular phone. In the example of FIG. 4, an STA 1, an STA 3, and an STA 4 correspond to the non-AP STA and an STA 2 and an STA 5 correspond to the AP STA.

In the following description, the non-AP STA may be called a terminal, a wireless transmit/receive unit (WTRU), a user equipment (UE), a mobile station (MS), a mobile terminal (MT), a mobile subscriber station (MSS), and the like. And, the AP is a concept corresponding to a base station (BS), a node B, an evolved Node B (eNB), a base transceiver system (BTS), a femto base station (femto BS), and the like in a different wireless communication field.

IEEE 802.11af

Currently, ongoing effort to develop IEEE 802.11af standard has been performed. IEEE 802.11af standard is a standard set to regulate an operation of an unlicensed device in a TV whitespace (TVWS) band.

The TVWS band is a frequency band assigned for a TV broadcast and includes a Very High Frequency (VHF) band and an Ultra High Frequency (UHF) band. The TVWS means a frequency band permitted to an unlicensed device to use under a condition that the unlicensed device does not impede a communication of a licensed device operating in a corresponding frequency band.

A TVWS band or a bandwidth of each TV channel in the TVWS band may vary according to each region. For instance, in the United States, services are provided on VHF and UHF channel bands (54-60 MHz, 76-88 MHz, 174-216 MHz, 512-608 MHz and 614-698 MHz band) as the TVWS band and a bandwidth of a single TV channel is defined by 6 MHz, respectively. And, in the United Kingdom, services are provided on UHF TV channel band (480-790 MHz band except 550-614 MHz) as the TVWS band and a single TV channel is defined by 8 MHz, respectively.

In order for an unlicensed device (e.g., an STA of WLAN system) to operate in the TVWS, a protection scheme for a licensed device (or incumbent user) should be preferentially provided. Hence, an STA should find out a channel, which is not used by the licensed device, available for the unlicensed device and should operate on the available channel. If the channel used by the STA does not correspond to the available channel anymore, the STA stops using the channel.

In order for the STA to identify channel availability in the TVWS, the STA can find out a TV channel schedule in a manner of performing spectrum sensing or accessing a geo-location database (hereinafter abbreviated GDB). The GDB may be called a whitespace database (WDB). GDB information may include such information as specific channel usage schedule (i.e., channel usage time) of a licensed device in a specific location and the like. An STA, which eagers to identify TV channel availability, should obtain GDB information based on location information of the STA in a manner of accessing the GDB via the internet and the like and this should be performed in time unit sufficient enough to protect a licensed device.

According to current IEEE 802.11af standard, a device type is mainly defined by two types. In particular, the device type is classified into an enabling device corresponding to a device capable of directly accessing the GDB that obtains operation parameters specified by a geographical location at which the device exists in a manner of accessing the GDB and a dependent device corresponding to a device incapable of directly accessing the GDB that obtains operation parameters specified by a geographical location at which the device exists from the enabling device. The enabling device may be called a master device and the dependent device may be called a client device or a slave device. Both the enabling device and the dependent device may correspond to a general STA (i.e., such a terminology as an STA includes an AP and a non-AP) in WLAN system.

According to a current regulation for a TVWS of FCC (federal communications commission), a device type is mainly defined by two types. In particular, one is a personal/portable (P/P) device of a low power capable of being carried by a person and another one is a fixed device of a high power operating in a fixed position. The P/P device can be classified into a Mode II device and a Mode I device according to whether the P/P device has capability of identifying a location of the P/P device, i.e., geo-location determination capability and capability of accessing a GDB via the internet access. In this case, the Mode II device or the fixed device corresponds to an enabling device (master device) and the Mode I device may correspond to a dependent device (client/slave device).

In the following, an example of a process for a dependent device operating in a whitespace band to obtain available channel information from an enabling device. For clarity, a device capable of directly accessing a GDB is commonly called an 'enabling STA' and a device incapable of directly accessing the GDB is commonly called a 'dependent STA' in the following.

Figure 5:
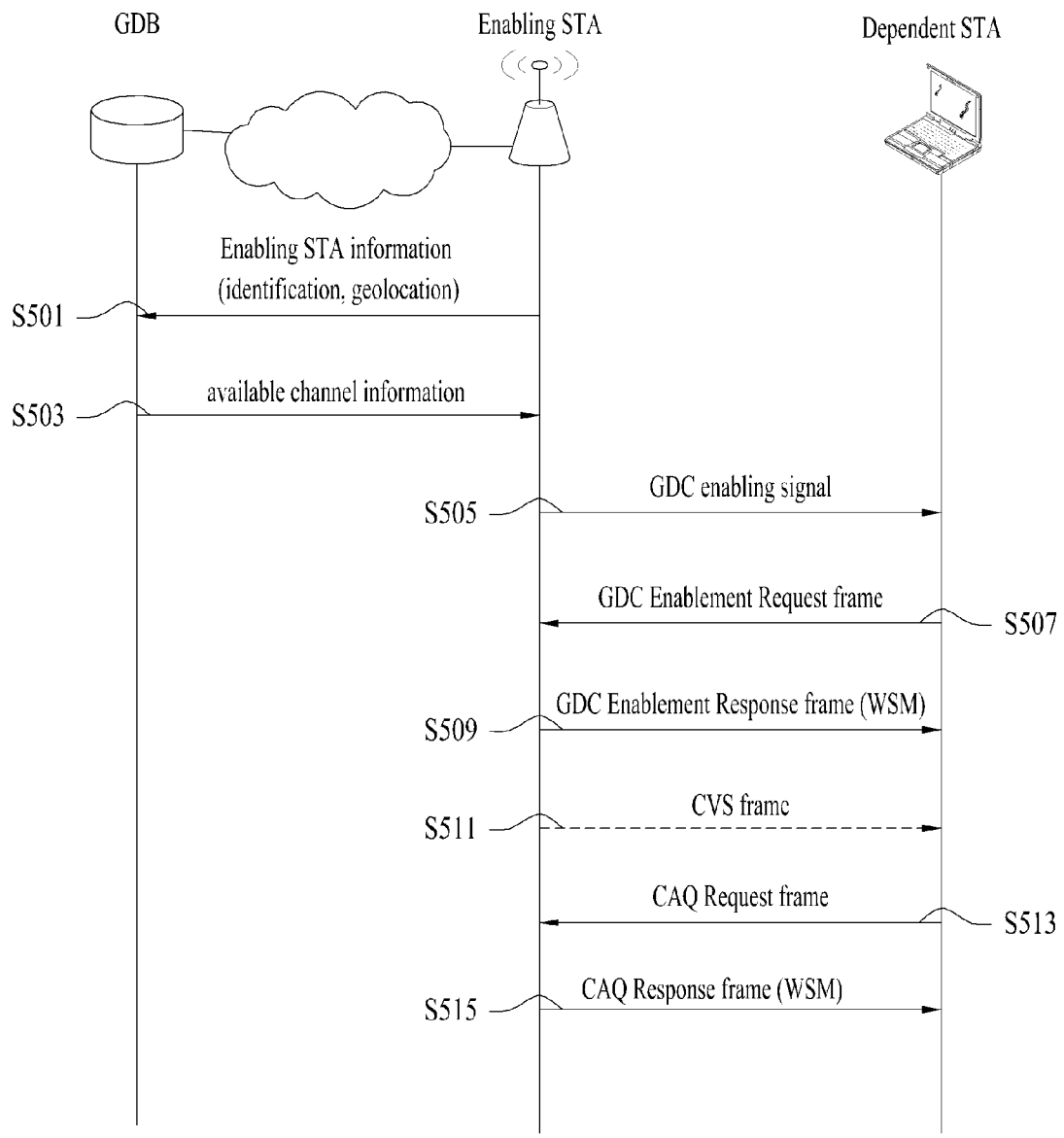
FIG. 5 is a diagram for an example of an operation between stations operating under a control of a geo-location database according to one embodiment of the present invention.

FIG. 5 is a diagram for an example of an operation between stations operating under a control of a geo-location database according to one embodiment of the present invention.

Referring to FIG. 5, an enabling STA accesses a GDB via the Internet and the like and may be then able to transmit information of the enabling STA to the GDB according to a regulation of a region at which the enabling STA is located [S501]. In this case, the enabling STA information may include an identifier of the enabling STA and geolocation information of the enabling STA. If necessary, the enabling STA may also transmit other information to the GDB together with the identifier and the geolocation information of the enabling STA.

Subsequently, the enabling STA can obtain information on a channel list, which is available within a TVWS band in a current position of the enabling STA, from the GDB [S503].

Having received the information on the available channel list from the GDB, the enabling STA can construct a BSS by transmitting a GDC enabling signal (geo-location database controlled enabling signal) [S505]. In particular, in order to inform a dependent STA of provision of a GDC enablement service, the enabling STA can transmit the GDC enabling signal via a channel on an available frequency. The GDC enabling signal may correspond to a beacon frame and can be periodically transmitted.

Prior to transmitting a GDC enablement response frame to the dependent STA in a specific regulatory domain, the enabling STA may be required to perform a secure authentication process and/or an association process with the dependent STA. If the aforementioned requisite exists, the enabling STA accesses the GDB and may be then able to check whether the dependent STA is authenticated to operate on a frequency band (e.g., TVWS).

A dependent STA trying to participate in the BSS can perform a scanning process for an operation channel in TVWS. If the dependent STA knows a channel list available in a current location of the dependent STA, the dependent STA can perform a passive or an active scanning for a channel of the available channel list only. The passive scanning indicates a process of listening to the GDC enabling signal transmitted from the enabling STA by the dependent STA on a scanning channel. The active scanning indicates that the dependent STA transmits a probe request frame on the scanning channel and receives a probe response frame from the enabling STA. On the other hand, if the dependent STA is not aware of the channel list available in the current location of the dependent STA, the dependent STA should receive the GDC enabling signal via the passive scanning Hence, if the dependent STA receives the GDC enabling signal (or probe response frame) from the enabling STA via a scanning operation, the dependent STA can switch to a state capable of transmitting a GDC enablement request frame to an enabling device.

Subsequently, in order for the dependent STA to participate in the BSS, the dependent STA should operate under a control of the enabling STA.

Having completed the scanning process, the dependent STA transmits a GDC enablement request frame to the enabling STA to participate in the BSS [S507].

Subsequently, having received the GDC enablement request frame, the enabling STA transmits a GDC enablement response frame to the dependent STA, which has transmitted the GDC enablement request frame [S509]. The GDC enablement response frame may include a status code indicating acceptance or denial for the GDC enablement request.

The GDC enablement response frame can include a white space map (hereinafter abbreviated WSM). The WSM corresponds to information on channels usable by an unlicensed device on a TVWS band made by a form of a map based on channels and frequency information obtained by the enabling STA from the GDB. The WSM can include available channel list or frequencies usable by an unlicensed device and information on transmit power maximally permitted on a corresponding available channel. In this case, channels included in the available channel list correspond to channels not used by legally protected signals (or users). When an unlicensed device accesses the GDB, the unlicensed device can use the channels. Or, in case that an unlicensed device makes a request for an available channel after specific time is passed by from timing of accessing the GDB, the channel list may include information on channels and frequencies available from corresponding timing. Or, in case that an unlicensed device makes a request for an available channel to the GDB, the GDB may signal to the unlicensed device for channels unavailable for the unlicensed device to deliver information on the available channel and frequency. In case that an operation channel bandwidth (WLAN channel) is spanning over multiple channels indicated in the WSM, since a maximum power level varies according to each of the multiple channels, an actual transmit power level may be restricted by a minimum transmit power level among various transmit power levels of the multiple channels.

A WSM can include a map ID field, a channel number field, a maximum power level field, a valid time field and the like. Yet, this is just an example. A WSM of a different form including information on an available channel can be applied to examples of the present invention.

The map ID field indicates an ID of an available channel list. The channel number field indicates a channel number usable by a TVWS device. The channel number can be represented by a TV channel number, a spectrum range and the like and has a meaning as information capable of specifying an available channel in frequency domain. The maximum power level field indicates maximum transmit power of a TVWS device on an available channel. The valid time field indicates duration capable of consistently using an available channel. The valid time field can be included in a WSM not mandatorily but optionally.

Subsequently, the dependent STA receives the WSM and may be then able to start to transceive data, control frame, a management frame and the like with the enabling STA.

Besides the GDC enablement response frame, the enabling STA can transmit the WSM to the dependent STA via a channel availability query (CAQ) response frame or a WSM announcement frame.

The enabling STA checks that the dependent STA is located at a reception range of the enabling STA and may be then able to periodically transmit a contact verification signal frame (CVS frame) to the dependent STA to validate an available channel list [S511]. In particular, the enabling STA can periodically transmit the CVS frame to maintain validity of a connection with the dependent STA located at a service range of the enabling STA. The dependent STA receives the CVS frame to verify whether the dependent STA is located at the reception range of the enabling STA, which has provided the WSMs to the dependent STA.

The dependent STA compares a value of a map ID field of a previously received WSM with a value of a map ID field of the CVS frame and may be then able to periodically check a currently valid channel. The dependent STA can determine that a WSM not indicated by the map ID of the CVS frame is not valid. If the values of the map ID fields are identical to each other, the dependent STA assumes that the previously received WSM is still valid and can continuously use the WSM.

On the contrary, if the values of the map ID fields are different from each other, the previously received WSM is invalid. The dependent STA transmits a channel availability query (CAQ) request frame to the enabling STA to obtain information on a new available channel [S513].

Having received the CAQ request frame, the enabling STA transmits a channel availability query (CAQ) response frame to the dependent STA to update information on available channels. The CAQ response frame may include an updated WSM. Subsequently, the dependent STA can start to transceive data, a control frame, a management frame and the like with the enabling STA by receiving the updated WSM.

A Method of Setting an Operation Channel Based on Carrier Frequency Offset Estimation It requires to have a method of configuring a channel (or band) (in the following, it is called an operation channel (or band) to differentiate from a TV channel) for a communication system (e.g., WLAN) operating in TVWS. A TV channel usable by a TVWS device may vary according to a location of the device and the like. In particular, in order to smoothly support operations of the TVWS device in a situation that consecutive TV channels are unavailable on a frequency, it may consider a method of supporting contiguous or non-contiguous operation channels.

In the present invention, a basic unit supported by an operation channel may be called a frequency segment. If it is assumed that a bandwidth of a basic unit supported by an operation channel corresponds to W MHz, a bandwidth of an operation channel in TVWS can be defined by such a contiguous form as W, 2W, 4W, 8W and the like. Or, it may be defined by such a non-contiguous form as W+W, 2W+2W or the like. Information on the bandwidth of the operation channel can be defined via an operation information element.

For instance, if W corresponds to 2 MHz, it may define an operation channel (i.e., 2 MHz channel) including one frequency segment, an operation channel (i.e., 4 MHz channel) including two contiguous frequency segments, an operation channel (i.e., 8 MHz channel) including four contiguous frequency segments, an operation channel (i.e., 16 MHz channel) including eight contiguous frequency segments and the like. Moreover, it may define an operation channel (i.e., 2 MHz+2 MHz channel) including 2 non-contiguous frequency segments, an operation channel (i.e., 4 MHz+4 MHz channel) including 2 non-contiguous frequency parts in which contiguous frequency segments are respectively included, and the like. Yet, 'W=2 MHz' is just an example only. A scope of the present invention includes examples of frequency segments containing bandwidths different from each other.

A primary channel indicates a common operation channel of all STAs belonging to a BSS. In particular, the primary channel corresponds to a basic channel of an operation of an STA. Meanwhile, a secondary channel corresponds to a channel associated with the primary channel and is used to support a wider bandwidth and high throughput in a manner of being aggregated with the primary channel. For instance, in case that a 4 MHz channel includes two 2 MHZ channels, it should decide a location of a primary channel among the two 2 MHz channels. The location of the primary channel can indicates whether the location corresponds to a high frequency part or a low frequency part among the two 2 MHz channels.

Configuration (i.e., channelizing) of an operation channel for a system operating in TVWS can be determined based on an available channel (i.e., a TV channel in which an incumbent user does not exist). For instance, if a use of contiguous TV channels is unavailable (i.e., if a TV channel n is usable by an unlicensed device but a TV channel n−1 and a TV channel n+1 are not usable by the unlicensed device) or the use of contiguous TV channels is available, channelizing for the TVWS system can be determined in a manner of considering how many contiguous TV channels are available. In particular, an operation channel can be configured.

As mentioned in the foregoing description, an enabling STA can provide configuration information on an operation channel, which is determined based on an available TV channel, to a dependent STA. For instance, configuration information on an operation channel can include a channel start frequency, a channel bandwidth, a channel center frequency index (a center frequency index of a frequency segment including a primary channel and a center frequency index of a frequency segment not including the primary channel), primary channel location and the like. In this case, the channel start frequency can be defined by operating class information. And, information on a channel bandwidth (e.g., W, 2W, 4W, W+W, 2W+2W and the like) can be defined by the operation channel information element and the like. A parameter for the channel center frequency index, the primary channel location and the like can be defined by PLME MIB (physical layer management entity management information base) and the like.

Meanwhile, in case of IEEE 802.11ac (very high throughput), it supports frequency bandwidths of 20 MHz, 40 MHz, 80 MHz and 160 MHz.

Figure 6:
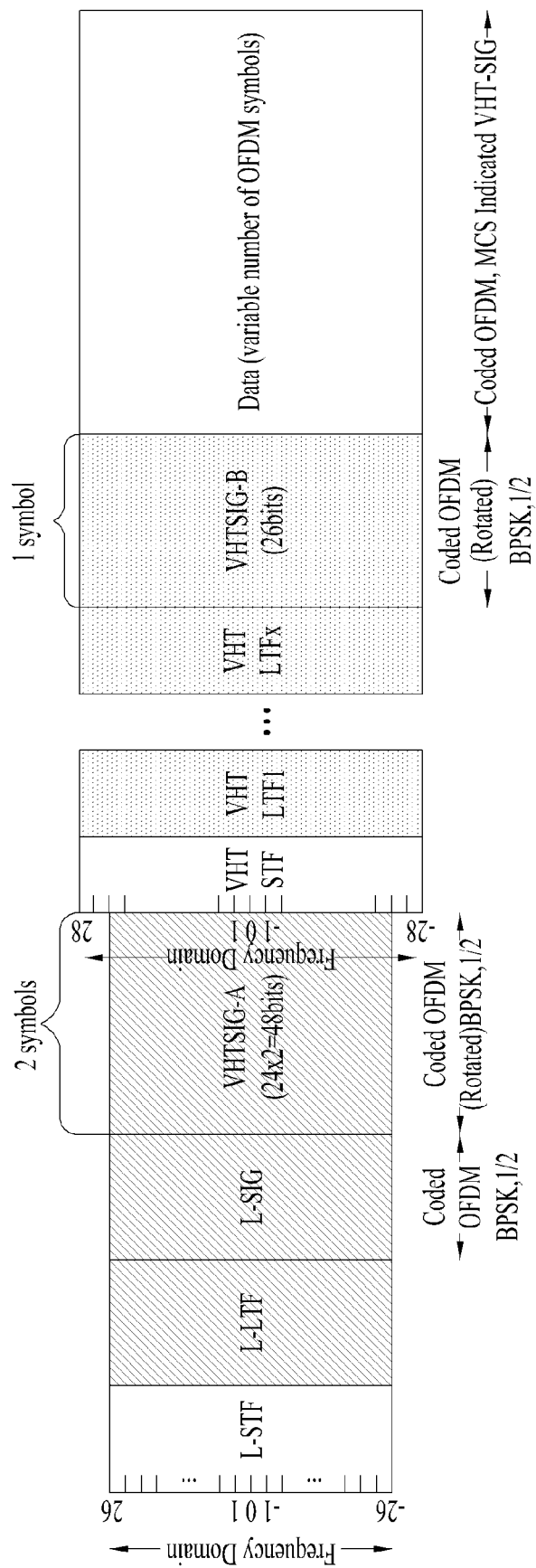
FIGS. 6 to 8 are diagrams for an example of a frame format in case that an operation channel uses a single bandwidth in IEEE 802.11ac system.
Figure 7:
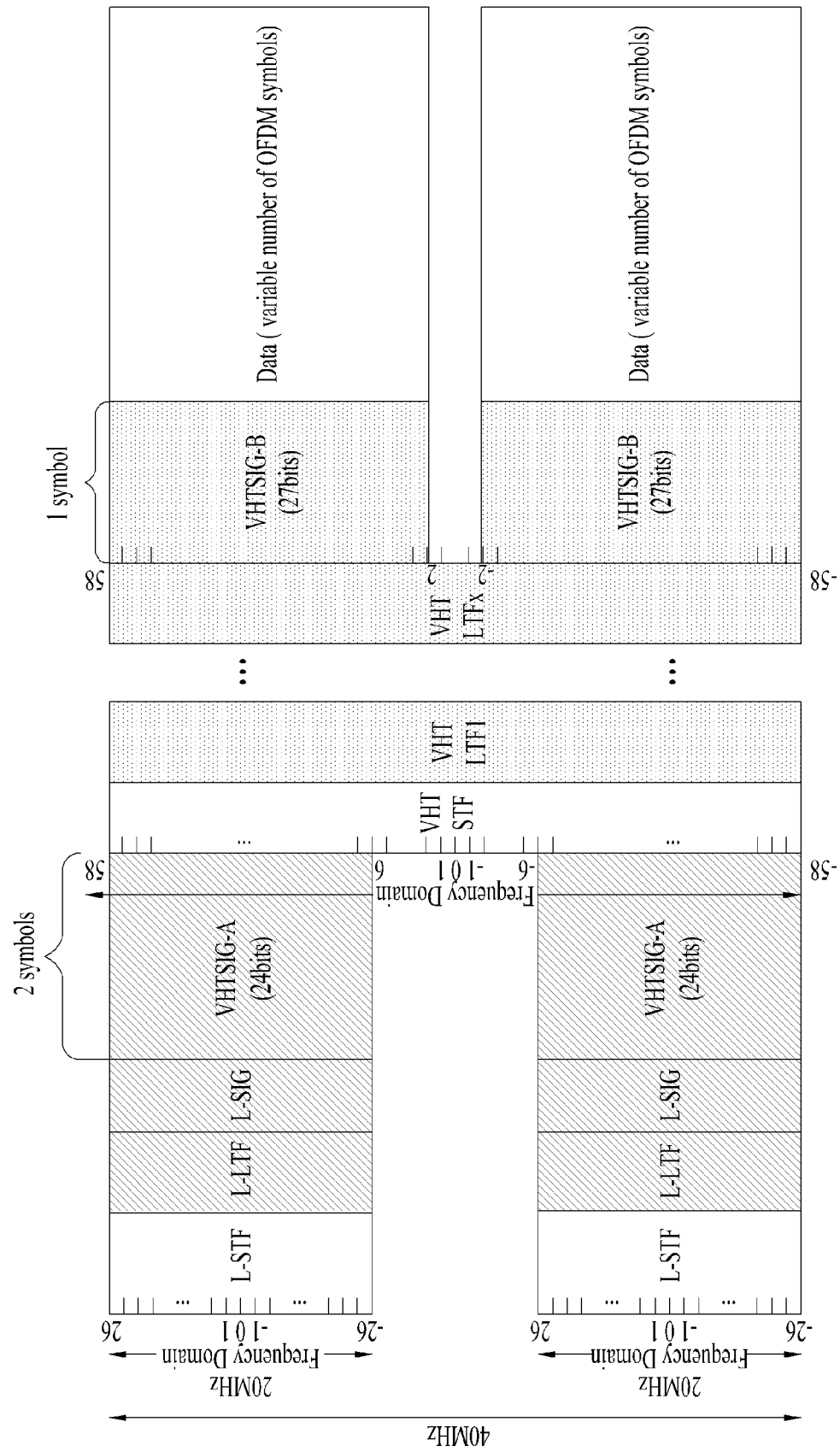
Figure 8:
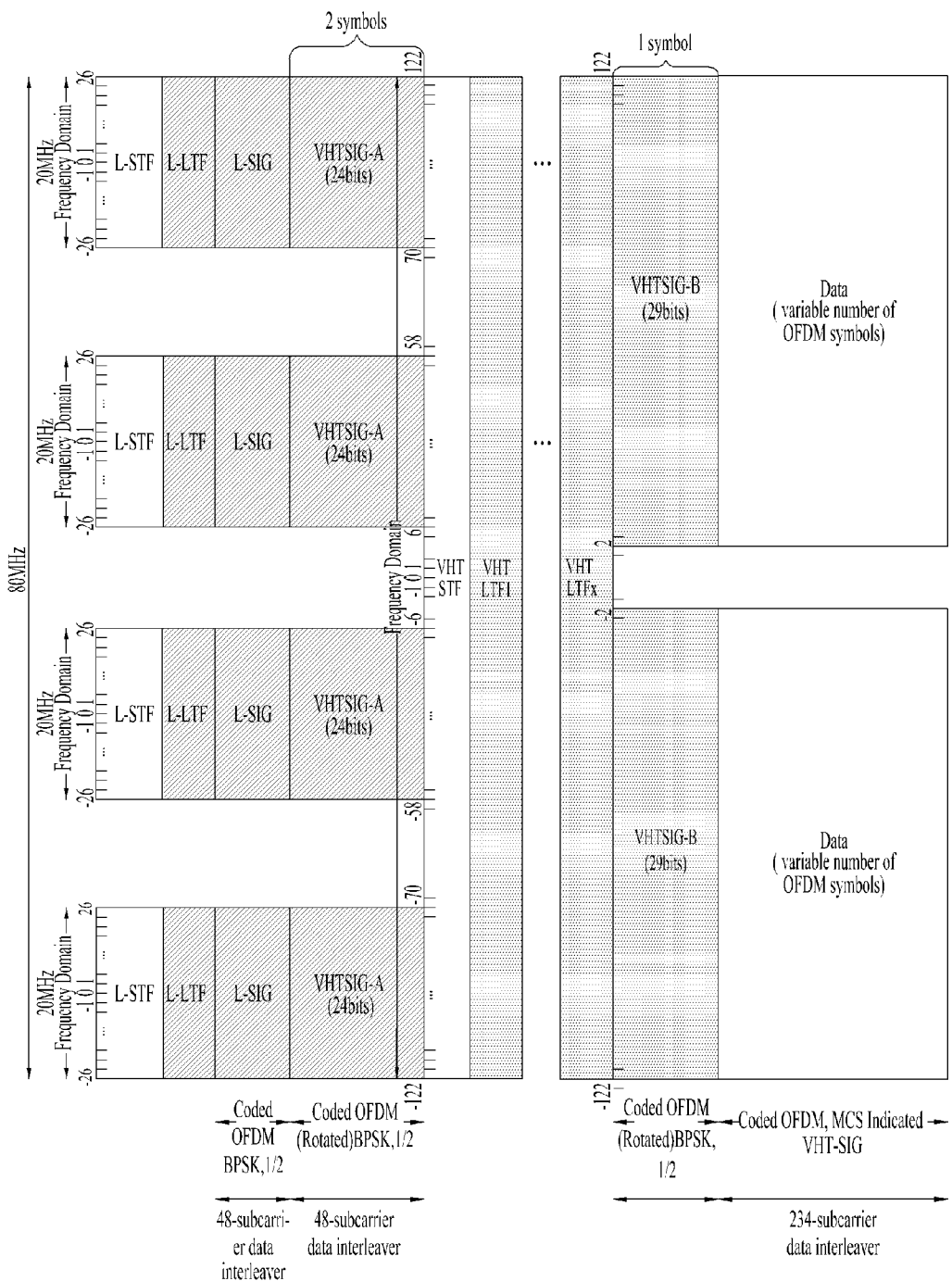

FIGS. 6 to 8 are diagrams for an example of a frame format in case that an operation channel uses a single bandwidth in IEEE 802.11ac system.

FIG. 6 shows a case that a single bandwidth corresponds to 20 MHz, FIG. 7 shows a case that the single bandwidth corresponds to 40 MHz and FIG. 8 shows a case that the single bandwidth corresponds to 80 MHz. Although a frame configuration of a case that the single bandwidth corresponds to 160 MHz is not depicted, the frame configuration can be implemented using two 80 MHz frames.

In IEEE 802.11ac system, a frame format is configured by including a data field transmitting an L-STF (non-HT short training field), an L-LTF (non-HT long training field), an L-SIG (non-HT SIGNAL) field, a VHT-SIG-A (VHT signal A) field, a VHT-STF (VHT short training field), a VHT-LTF (VHT long training field), a VHT-SIG-B (VHT signal B) field and a PSDU(s) (PLCP service data unit). In this case, the L-STF, the L-LTF and the L-SIG field are included in a preamble of IEEE 802.11ac system. A preamble part in each channel bandwidth has a structure in which a preamble of a frame having 20 MHz channel bandwidth is repeating. For instance, in case of a 40 MHz channel bandwidth, a preamble of a frame where a channel bandwidth corresponds to 20 MHz is repeatedly used twice. In case of an 80 MHz channel bandwidth, a preamble of a frame where a channel bandwidth corresponds to 20 MHz is repeatedly used by 4 times.

In a frame of IEEE 802.11ac system, the number of subcarrier actually used in the L-STF, the L-LTF, the L-SIG field and the VHT SIG-A field is configured to be equal to the number of subcarrier used in IEEE 802.11a or IEEE 802.11g system. By doing so, a legacy user of IEEE 802.11a or IEEE 802.11g system can read a signal (SIG) of the frame of IEEE 802.11ac system. Yet, since the legacy user does not exist in a TVWS band to be used in IEEE 802.11af system, the number of subcarrier or an OFDM parameter used in the L-STF, the L-LTF, the L-SIG field and the VHT SIG-A field can be configured in a manner of being identical to the VHT-LTF field or the data field. For instance, referring back to FIG. 6, although FIG. 6 shows an example that the L-STF, the L-LTF, the L-SIG field and the VHT SIG-A field are configured by 52 subcarriers, similar to the VHT-LTF or the data field, the L-STF, the L-LTF, the L-SIG field and the VHT SIG-A field can be configured by 56 subcarriers. Moreover, a name of each field can be named by a name different from a legacy name. As an example, the name of each field can be modified into an O-STF (omni-STF), an O-LTF (omni-LTF), an O-SIG (omni-SIG) field, WS SIG-A field and the like.

According to IEEE 802.11af system, a method of making a bandwidth of a physical layer frame narrower in a manner of down-clocking a physical layer frame of IEEE 802.11ac standard is considering. The down-clocking means to reduce a frequency bandwidth as much as a down-clocking ratio in a manner of making a sampling period become greater than a legacy sampling period. For instance, a 20 MHz bandwidth, a 40 MHz bandwidth and an 80 MHz bandwidth may become a 4 MHz bandwidth, an 8 MHz bandwidth and a 16 MHz bandwidth, respectively, in a manner of performing 5 times down-clocking on the physical layer frame of IEEE 802.11ac system. And, a frequency bandwidth may become 5 MHz, 10 MHz or 20 MHz in a manner of performing 4 times or 8 times down-clocking on the physical layer frame of IEEE 802.11ac system. Moreover, a frequency bandwidth may become 40/6 MHz (about 6.67 MHz), 80/6 MHz (about 13.3 MHz) or the like in a manner of performing 6 times down-clocking on the physical layer frame of IEEE 802.11ac system.

According to IEEE 802.11af system, a physical layer of TVWS can be configured as follows.

One TVWS channel consists of 144 subcarriers. Due to a high ACLR (adjacent channel leakage ratio) requisite, an STA cannot use all TVWS channels for data transmission. Instead, the STA may use a part of the TVWS channels only. Hence, 128 subcarriers among the 144 subcarriers can be defined based on a 40 MHz bandwidth option of IEEE 802.11ac. A signal based on this can be defined as a single base block (BLCK). And, in order to prevent co-existence of bandwidths different from each other of BSSs different from each other from affecting detection of a preamble of an STA, data can be transmitted in a center of a TVWS band.

When data is transmitted using multiple TVWS channels (e.g., in case that there exist 2 contiguous TVWS channels), if a center (or a boundary between the 2 contiguous TVWS channels) of the 2 contiguous TVWS channels corresponds to a subcarrier index 0, centers of each block may correspond to a subcarrier index −72 and a subcarrier index 72, respectively, in case that frequency is incrementally divided by one subcarrier spacing. In particular, referring to the example shown in FIG. 7, a center frequency of the L-STF and a center frequency of the L-LTF are matched with the subcarrier index −72 and the subcarrier index 72 of the 2 contiguous TVWS channels, respectively. In case that there exist 4 contiguous TVWS channels, if a boundary between preceding 2 TVWS channels and following 2 TVWS channels corresponds to an index 0, when frequency is incrementally divided by one subcarrier spacing, centers of each block correspond to a subcarrier index −216, −72, 72 and 216, respectively. In particular, referring to the example shown in FIG. 8, a center frequency of the L-STF and a center frequency of the L-LTF are matched with the subcarrier index are matched with the subcarrier indexes of 4 contiguous TVWS channels −216, −72, 72 and 216, respectively.

According to IEEE 802.11ac, in case of 40 MHz VHT PPDU (protocol data unit) transmission, 40 MHz is divided into 128 subcarriers and signals are transmitted on subcarriers from a subcarrier index −58 to a subcarrier index −2 and subcarriers from a subframe index 2 to a subframe index 58. In case of 80 MHz VHT PPDU (protocol data unit) transmission, 80 MHz is divided into 256 subcarriers and signals are transmitted on subcarriers from a subcarrier index −122 to a subcarrier index −2 and subcarriers from a subcarrier index 2 to a subcarrier index 122.

As mentioned in the foregoing description, IEEE 802.11 af system is considering a method of making a bandwidth of a physical layer frame narrower in a manner of down-clocking a physical layer frame of IEEE 802.11ac standard mentioned earlier in FIG. 6 to FIG. 8. In case of transmitting the physical layer frame of IEEE 802.11ac on a TVWS channel according to IEEE 802.11af, the frame can be transmitted as follows. A PHY defined by IEEE 802.11af is called TVHT (TV high throughput).

In case of single band TVHT PPDU transmission, one TVWS channel (e.g., 6 MHz in the United States, 8 MHz in the United Kingdom) is divided into 144 subcarriers and signals are transmitted on subcarriers from a subcarrier index −58 to a subcarrier index −2 and subcarriers from a subcarrier index 2 to a subcarrier index 58. In case of two bands TVHT PPDU transmission, 2 TVWS channels (e.g., 12 MHz in the United States, 16 MHz in the United Kingdom) are divided into 288 subcarriers and signals are transmitted on subcarriers from a subcarrier index −130 to a subcarrier index −74, subcarriers from a subcarrier index −70 to a subcarrier index −14, subcarriers from a subcarrier index 14 to a subcarrier index 70 and subcarriers from a subcarrier index 74 to a subcarrier index 130. Hence, 261 subcarriers ranging from a subcarrier index −130 to a subcarrier index 130 should be spanned. Unlike the VHT 80 MHz, IFFT (IDFT) of a size of 256 cannot transmit the subcarriers. In case of FFT/IFFT of 2 exponentiation, since the FFT/IFFT of 2 exponentiation is able to perform a job using a considerably efficient operation compared to other cases, the present invention proposes a method of supporting an operation channel on contiguous TVWS channels using the FFT/IFFT of 256 size without increasing a size of the FFT/IFFT.

Besides a different usage, an STF field and a LTF field of 802.11 system are used to correct (or compensate) a carrier frequency offset (hereinafter abbreviated CFO). In particular, the STF field and the LTF field are used to correct a CFO generated by an oscillator (OSC).

If capability of the CFO capable of being corrected by the STF field and the LTF field is greater than a range of the CFO generated by the OSC, a problem of a legacy method can be solved using the capability. In this case, if an OSC requirement of a general WLAN device is ±20 ppm, it may corresponds to ±14 kHz in 700 MHz band. Hence, it (14 kHz) is much smaller than 41.66 kHz, which is a result that 6 MHz (a single TV channel bandwidth) is divided by 144 (the number of subcarriers). Hence, CFO correction capability of the STF filed and the LTF field can be used for a different usage. For instance, when 2 bands TVHT PPDU are transmitted on 2 TVWS channels, if at least 3 subcarriers of one side and at least 2 subcarriers of another side can be shifted to a center of the two contiguous TVWS channels, respectively, 256 subcarriers from a subcarrier index −127 to a subcarrier index 128 or 256 subframes from a subcarrier index −128 to a subcarrier index 127 are spanned and the 256 subcarriers can be transmitted using IFFT (IDFT) of 256 size. In other word, if a center frequency of 2 bands TVHT PPDU is shifted to the inside of a range capable of being corrected by the transmission STF field, it is able to support an operation channel on contiguous TVWS channels using the FFT/IFFT of 256 size without affecting detection of a preamble of an STA at the same time.

Hence, the present invention proposes to change a position of a transmission signal as follows.

First of all, in case of 2 bands TVHT PPDU transmission, 2 TVWS channels (e.g., 12 MHz in the United States and 16 MHz in the United Kingdom) are divided into 288 subcarriers. Signals can be transmitted on subcarriers from a subcarrier index $-130+n$ to a subcarrier index $-74+n$, subcarriers from a subcarrier index $-70+n$ to a subcarrier index $-14+n$, subcarriers from a subcarrier index $14-m$ to a subcarrier index $70-m$ and subcarriers from a subcarrier index $74-m$ to a subcarrier index $130-m$. In particular, if a center (or a boundary between 2 contiguous TVWS channels) of 2 contiguous TVWS channels corresponds to a subcarrier index 0, a positive index is sequentially given in a frequency ascending order and a negative index is sequentially given in a frequency descending order, a signal can be transmitted on a subcarrier, which is shifted to a center of the contiguous TVWS channels as much as a first offset (n), on one channel and a signal can be transmitted on a subcarrier, which is shifted to the center of the contiguous TVWS channels as much as a second offset (m) on another channel.

In this case, if a sum of the first offset (n) and the second offset (m) is equal to or greater than 5 and less than 26 ($5 \leq n+m < 26$), a random n and m value can be used under the above condition. For instance, an n and m value can be determined by Formula 1 in the following.

If $n+m=5$: $(n,m)=(0,5),(1,4),(2,3),(3,2),(4,1)$ or $(5,0)$

If $n+m=6$: $(n,m)=(0,6),(1,5),(2,4),(3,3),(4,2),(5,1)$ or $(6,0)$

If $n+m=7$: $(n,m)=(0,7),(1,6),(2,5),(3,4),(4,3),(5,2),(6,1)$ or $(7,0)$ [Formula1]

In Formula 1, although a case that 'n+m=5' to 'n+m=7' is shown, the n and m value can be determined by a similar scheme in case of 'n+m=8' to 'n+m=26'.

In this case, in case of 2 TVWS channels, centers of each block are positioned at −72+n and 72−m, respectively. Similar to this, in case of 4 TVWS channels, centers of each block are positioned at −216+n, −72−m, 72+m and 216−m, respectively.

As a different method, in case of VHT PPDU 40 MHz defined by IEEE 802.11ac system, since no signal is transmitted on a subcarrier index −1, 0, and 1 in DC, the number of subcarriers used in DC is reduced to 1 and a position of a transmission signal may be changed as follows. In particular, a subcarrier index 0 can be used in DC only.

In case of 2 bands TVHT PPDU transmission, 2 TVWS channels (e.g., 12 MHz in the United States, 16 MHz in the United Kingdom) are divided into 288 subcarriers. Signals are transmitted on subcarriers from a subcarrier index −129+n to a subcarrier index −73+n, subcarriers from a subcarrier index −71+n to a subcarrier index −15+n, subcarriers from a subcarrier index 15−m to a subcarrier index 71−m and subcarriers from a subcarrier index 73−m to a subcarrier index 129−m. In particular, similar to the aforementioned embodiment 1, if a center (or a boundary between 2 contiguous TVWS channels) of 2 contiguous TVWS channels corresponds to a subcarrier index 0, a positive index is sequentially given in a frequency ascending order and a negative index is sequentially given in a frequency descending order, the subcarrier index 0 is used in DC only. Hence, both subcarriers used for transmitting a signal in the TVWS channels can be switched to the center of the contiguous TVWS channels as much as 1. Along with this, a signal can be transmitted on a subcarrier, which is shifted to the center of the contiguous TVWS channels as much as a first offset (n), on one channel and a signal can be transmitted on a subcarrier, which is shifted to the center of the contiguous TVWS channels as much as a second offset (m) on another channel.

In this case, if a sum of the first offset (n) and the second offset (m) is equal to or greater than 3 and less than 26 (3≤n+m<26), a random n and m value can be used under the above condition. For instance, an n and m value can be determined by Formula 2 in the following.

If $n+m=3$: $(n,m)=(0,3),(1,2),(2,1),(3,0)$

If $n+m=4$: $(n,m)=(0,4),(1,3),(2,2),(3,1),(4,0)$

If $n+m=5$: $(n,m)=(0,5),(1,4),(2,3),(3,2),(4,1)$ or $(5,0)$

If $n+m=6$: $(n,m)=(0,6),(1,5),(2,4),(3,3),(4,2),(5,1)$ or $(6,0)$

If $n+m=7$: $(n,m)=(0,7),(1,6),(2,5),(3,4),(4,3),(5,2),(6,1)$ or $(7,0)$ [Formula 2]

In Formula 2, although a case that 'n+m=3' to 'n+m=7' is shown, the n and m value can be determined by a similar scheme in case of 'n+m=8' to 'n+m=26'.

In this case, in case of 2 TVWS channels, centers of each block are positioned at −72+n and 72−m, respectively. Similar to this, in case of 4 TVWS channels, centers of each block are positioned at −216+n, −72−m, 72+m and 216−m, respectively.

Meanwhile, an STF signal is transmitted to one subcarrier in every 4 indexes in current frequency domain. By doing so, a CFO of maximum ±2 subcarrier spacing can be corrected. An LTF signal can correct a CFO of maximum ±0.5 subcarrier spacing.

Since it is ±14 kHz in the aforementioned general OSC requirement 20 ppm, i.e., since it is smaller than ±0.5 subcarrier spacing, a CFO is estimated by the LTF signal and an arbitrary CFO by the n and m according to the aforementioned embodiment can be compensated via the STF. Yet, since the STF of a current scheme is unable to compensate up to ±2 subcarrier spacing, the STF can support a case that the a sum of the n and the m is equal to 4 and less than 4.

Hence, in order to support a case that the sum of the n and the m is equal to and greater than 4, it is necessary to additionally design an STF of a different scheme.

For instance, in order to compensate up to ±4 subcarrier spacing, an STF signal is transmitted to one subcarrier in every at least 8 subcarrier indexes. Or, it may simply use an STF sequence of VHT 20 MHz to compensate up to the ±4 subcarrier spacing.

First of all, an STF 20 MHz signal defined by 802.11a/g system can be represented by Formula 3 in the following and the STF 20 MHz signal can be transmitted in a manner of being modified as shown in Formula 4. In this case, assume that power scaling is omitted.

$S_{-26,26}=\{0,0,1+j,0,0,0,-1-j,0,0,0,1+j,0,0,0,-1-j,0,0,$
$0,-1-j,0,0,0,1+j,0,0,0,0,0,0,0,-1-j,0,0,0,-1-j,0,$
$0,0,1+j,0,0,0,1+j,0,0,0,1+j,0,0,0,1+j,0,0\}$ [Formula 3]

$TVHTS_{-52,52}=\{0,0,0,0,1+j,0,0,0,0,0,0,0,-1-j,0,0,0,0,$
$0,0,0,1+j,0,0,0,0,0,0,0,-1-j,0,0,0,0,0,0,0,-1-j,0,$
$0,0,0,0,0,0,1+j,0,0,0,0,0,0,0,0,0,0,0,0,0,-1-j,$
$0,0,0,0,0,0,0,-1-j,0,0,0,0,0,0,0,1+j,0,0,0,0,0,0,0,$
$1+j,0,0,0,0,0,0,0,1+j,0,0,0,0,0,0,0,1+j,0,0,0,0\}$ [Formula 4]

Or, an STF 20 MHz signal defined by 802.11n/ac system can be represented by Formula 5 in the following and the STF 20 MHz signal can be transmitted in a manner of being modified as shown in Formula 6. In this case, assume that power scaling is omitted.

$HTS_{-28,28}=\{0,0,0,0,1+j,0,0,0,-1-j,0,0,0,1+j,0,0,0,-1-j,0,0,0,-1-j,0,0,0,1+j,0,0,0,0,0,0,0,-1-j,0,0,0,-1-j,0,0,0,1+j,0,0,0,1+j,0,0,0,1+j,0,0,0,0\}$ [Formula 5]

$TVHTS_{-56,56}=\{0,0,0,0,0,0,0,0,1+j,0,0,0,0,0,0,0,-1-j,0,0,0,0,0,0,0,1+j,0,0,0,0,0,0,0,-1-j,0,0,0,0,0,0,0,0,0,0,0,-1-j,0,0,0,0,0,0,0,1+j,0,0,0,0,0,0,0,0,-1-j,0,0,0,0,0,0,0,-1-j,0,0,0,0,0,0,0,1+j,0,0,0,0,0,0,0,1+j,0,0,0,0,0,0,0,1+j,0,0,0,0,0,0,0,0,0\}$ [Formula 6]

Meanwhile, as shown in the example of FIG. 5, an enabling STA obtains information on an available TV channel from a geo-location database (GDB). When the GDB informs the enabling STA that 2 contiguous TVWS channels are available and the enabling STA wants to perform multiple bandwidth transmission, if a center (or a boundary between 2 contiguous TVWS channels) of the 2 contiguous TVWS channels corresponds to a subcarrier index 0, a positive index is sequentially given in a frequency ascending order and a negative index is sequentially given in a frequency descending order, center frequencies of each block can be transmitted in a manner of being carried on a subcarrier index −72+n and a subcarrier index 72−m, respectively. Or, when the GDB informs the enabling STA that 4 contiguous TVWS channels are available and the enabling STA wants to perform multiple bandwidth transmission, if a center (or a boundary between 2 contiguous lower TVWS channels and 2 contiguous upper TVWS channels among the 4 contiguous TVWS channels) of the 4 contiguous TVWS channels corresponds to a subcarrier index 0, a positive index is sequentially given in a frequency ascending order and a negative index is sequentially given in a frequency descending order, center frequencies of each block can be transmitted in a manner of being carried on a subcarrier index −216+n, a subcarrier index −72−m, a subcarrier index 72+n and a subcarrier index 216−m, respectively. In this case, the n and m are identical to what is mentioned above. Consequently, if a plurality of contiguous TVWS channels are available, a plurality of the contiguous TVWS channels are divided into two contiguous TVWS channels. Center frequencies of each block respectively transmitted from the two contiguous TVWS channels are switched to a center of the two contiguous TVWS channels as much as m and n, respectively.

If 2 or 4 non-contiguous TVWS channels are available, n and m may correspond to "0". For instance, if a positive index is sequentially given in a frequency ascending order for indexes of an upper TVWS channel and a negative index is sequentially given in a frequency descending order for indexes of a lower TVWS channel, center frequencies of each block are transmitted in a manner of being carried on a subcarrier index −72 and a subcarrier index 72, respectively. Or, an index of each TVWS channel can be used in a manner of being identical to one TVWS channelizing method.

A GDC dependent STA performs a scanning based on 1 TVWS channel block, corrects a CFO and determines whether it corresponds to multiple channel transmission using bandwidth information and the like informed by SIG and the like. If it corresponds to the multiple channels transmission, the GDC dependent STA performs demodulation based on the above-mentioned index.

According to the present invention mentioned in the foregoing description, although there exist STAs using different bandwidth for different BSS, a preamble can be detected via an operation of correcting a CFO using an STF field and/or a LTF field.

The Generals of Device to which the Present Invention is Applicable

Figure 9:
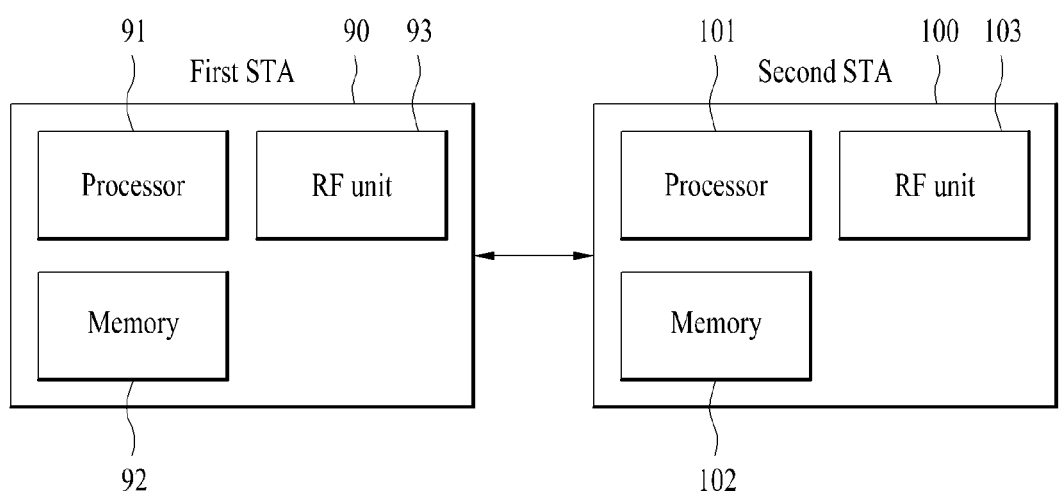
FIG. 9 is a block diagram for a wireless communication device according to one embodiment of the present invention.

FIG. 9 is a block diagram for a wireless communication device according to one embodiment of the present invention.

Referring to FIG. 9, a first STA 90 includes a processor 91, a memory 92, and a RF (radio frequency) unit 93. The processor 91 is configured to implement a proposed function, a procedure and/or a method. Layers of a radio interface protocol can be implemented by the processor 91. The memory 92 is connected with the processor 91 and stores various informations to drive the processor 91. The RF unit 93 is connected with the processor 91 and is configured to transmit/receive a radio signal.

A second STA 100 includes a processor 101, a memory 102, and a RF (radio frequency) unit 103. The processor 101 is configured to implement a proposed function, a procedure and/or a method. Layers of a radio interface protocol can be implemented by the processor 101. The memory 102 is connected with the processor 101 and stores various informations to drive the processor 101. The RF unit 103 is connected with the processor 101 and is configured to transmit/receive a radio signal.

The memory 92/102 can be positioned at an inside or an outside of the processor 91/101 and can be connected to the processor 91/101 with a well-known means. And, the first STA 90 and/or the second STA 100 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Although various embodiments according to the present invention mainly concern examples applied to IEEE 80.11 system, it may be applicable to various kinds of wireless access systems as well as the IEEE 802.11 system.

What is claimed is:
1. A method for setting an operation channel by a device in a white space band, the method comprising:
  obtaining information on an available TV channel from a geo-location database (GDB); and
  if a plurality of contiguous TV channels are available, setting an operation channel containing multiple bandwidths to the plurality of the contiguous TV channels,
  wherein center frequencies of signals respectively transmitted from 2 contiguous TV channels contained in the plurality of the contiguous TV channels are shifted to a center of the 2 contiguous TV channels as much as a first offset (m) and a second offset (n), respectively, and wherein, when a number of the plurality of the contiguous TV channels corresponds to 2, if a subcarrier index 0 is given to a boundary of the plurality of the contiguous TV channels, a positive subcarrier index is sequentially given in a frequency ascending order, and a negative subcarrier index is sequentially given in a frequency descending order, then the center frequencies of the signals respectively transmitted from the plurality of the contiguous TV channels are positioned at a subcarrier index (−72+n) and a subcarrier index (72−m), respectively.

2. The method of claim 1, wherein, when a number of the plurality of the contiguous TV channels corresponds to 4, if a subcarrier index 0 is given to a boundary between contiguous 2 lower TV channels and contiguous 2 upper TV channels among the plurality of the contiguous TV channels, a positive subcarrier index is sequentially given in a frequency ascending order, and a negative subcarrier index is sequentially given in a frequency descending order, then the center frequencies of the signals respectively transmitted from the plurality of the contiguous TV channels are positioned at a subcarrier index (−216+n), a subcarrier index (−72−m), a subcarrier index (72+n) and a subcarrier index (216−m), respectively.

3. The method of claim 1, wherein a sum of the m and the n is equal to or greater than 5, and is equal to or less than 26.

4. The method of claim 1, wherein a sum of the m and the n is equal to or greater than 3, and is equal to or less than 26.

5. The method of claim 1, wherein an STF (short training field) signal is transmitted on a single subcarrier in every 8 subcarrier indexes.

6. A device setting an operation channel in a white space band, comprising:
   an RF (radio frequency) unit configured to transmit and receive a radio signal; and
   a processor operably connected to the RF unit and configured to:
      obtain information on an available TV channel from a geo-location database (GDB); and
      if a plurality of contiguous TV channels are available, set an operation channel containing multiple bandwidths to the plurality of the contiguous TV channels,
   wherein center frequencies of signals respectively transmitted from 2 contiguous TV channels contained in the plurality of the contiguous TV channels are shifted to a center of the 2 contiguous TV channels as much as a first offset (m) and a second offset (n), respectively, and
   wherein, when a number of the plurality of the contiguous TV channels corresponds to 2, if a subcarrier index 0 is given to a boundary of the plurality of the contiguous TV channels, a positive subcarrier index is sequentially given in a frequency ascending order, and a negative subcarrier index is sequentially given in a frequency descending order, then the center frequencies of the signals respectively transmitted from the plurality of the contiguous TV channels are positioned at a subcarrier index (−72+n) and a subcarrier index (72−m), respectively.

7. The device of claim 6, wherein, when a number of the plurality of the contiguous TV channels corresponds to 4, if a subcarrier index 0 is given to a boundary between contiguous 2 lower TV channels and contiguous 2 upper TV channels among the plurality of the contiguous TV channels, a positive subcarrier index is sequentially given in a frequency ascending order, and a negative subcarrier index is sequentially given in a frequency descending order, then the center frequencies of the signals respectively transmitted from the plurality of the contiguous TV channels are positioned at a subcarrier index (−216+n), a subcarrier index (−72−m), a subcarrier index (72+n) and a subcarrier index (216−m), respectively.

8. The device of claim 6, wherein a sum of the m and then is equal to or greater than 5, and is equal to or less than 26.

9. The device of claim 6, wherein a sum of them and then is equal to or greater than and is equal to or less than 26.

10. The device of claim 6, wherein an STF (short training field) signal is transmitted on a single subcarrier in every 8 subcarrier indexes.

* * * * *